United States Patent
Desfriches et al.

(10) Patent No.: US 9,340,186 B2
(45) Date of Patent: May 17, 2016

(54) SYSTEM FOR CONTROLLING THE RELEASE OF AN AUTOMATIC PARKING BRAKE DEVICE ONBOARD AN AUTOMOBILE

(75) Inventors: Christophe Desfriches, Pacy-sur-Eure (FR); Pascal Febrer, Paris (FR); Alessandro Monti, La Garenne-Colombes (FR)

(73) Assignee: RENAULT S.A.S., Boulogne-Billancourt (FR)

( * ) Notice: Subject to any disclaimer, the term of this patent is extended or adjusted under 35 U.S.C. 154(b) by 607 days.

(21) Appl. No.: 12/675,528

(22) PCT Filed: Aug. 18, 2008

(86) PCT No.: PCT/FR2008/051504
§ 371 (c)(1),
(2), (4) Date: May 25, 2010

(87) PCT Pub. No.: WO2009/030855
PCT Pub. Date: Mar. 12, 2009

(65) Prior Publication Data
US 2010/0250062 A1    Sep. 30, 2010

(30) Foreign Application Priority Data
Aug. 31, 2007  (FR) ..................................... 07 57288

(51) Int. Cl.
*G06F 7/00* (2006.01)
*B60T 7/12* (2006.01)

(52) U.S. Cl.
CPC ............. *B60T 7/122* (2013.01); *B60T 2201/06* (2013.01)

(58) Field of Classification Search
CPC ................................ B60T 7/00; B60T 2201/06
USPC ............................................................ 701/36
See application file for complete search history.

(56) References Cited

U.S. PATENT DOCUMENTS

| | | | | |
|---|---|---|---|---|
| 5,139,315 A  * | 8/1992 | Walenty et al. | ............... | 303/162 |
| 5,675,190 A  * | 10/1997 | Morita | ......................... | 307/10.1 |
| 6,905,181 B2 * | 6/2005 | Iwagawa et al. | ............... | 303/155 |
| 7,630,814 B2 * | 12/2009 | Goss et al. | ........................ | 701/70 |
| 2003/0033073 A1* | 2/2003 | Kichima et al. | ................. | 701/96 |
| 2003/0036838 A1* | 2/2003 | Pfeil et al. | ........................ | 701/70 |
| 2004/0059479 A1* | 3/2004 | Fleming et al. | .................. | 701/29 |
| 2004/0124697 A1* | 7/2004 | MacGregor et al. | ............ | 303/89 |
| 2006/0049691 A1* | 3/2006 | Deprez et al. | .................. | 303/191 |
| 2006/0106520 A1* | 5/2006 | Bodin et al. | ..................... | 701/67 |
| 2008/0087509 A1* | 4/2008 | Kalbeck et al. | ............... | 188/156 |
| 2008/0147286 A1* | 6/2008 | Goss et al. | ........................ | 701/70 |
| 2011/0264346 A1* | 10/2011 | Kinder et al. | .................... | 701/70 |

FOREIGN PATENT DOCUMENTS

| | | | | |
|---|---|---|---|---|
| DE | 10 2005 014 242 | 10/2006 | | |
| EP | 1 327 566 | 7/2003 | | |
| FR | 2 828 450 | 2/2003 | | |
| JP | 59143745 A | * 8/1984 | ............. | B60T 13/74 |

* cited by examiner

*Primary Examiner* — Sheetal R Paulson
(74) *Attorney, Agent, or Firm* — Oblon, McClelland, Maier & Neustadt, L.L.P.

(57) ABSTRACT

A system for controlling release of an automatic parking brake device onboard an automobile, that includes a transmission mechanism transmitting an instruction several times for releasing the parking brake device, and an interface provided between the transmissions of the release instruction and for transmitting a release instruction of the parking brake device.

10 Claims, 1 Drawing Sheet

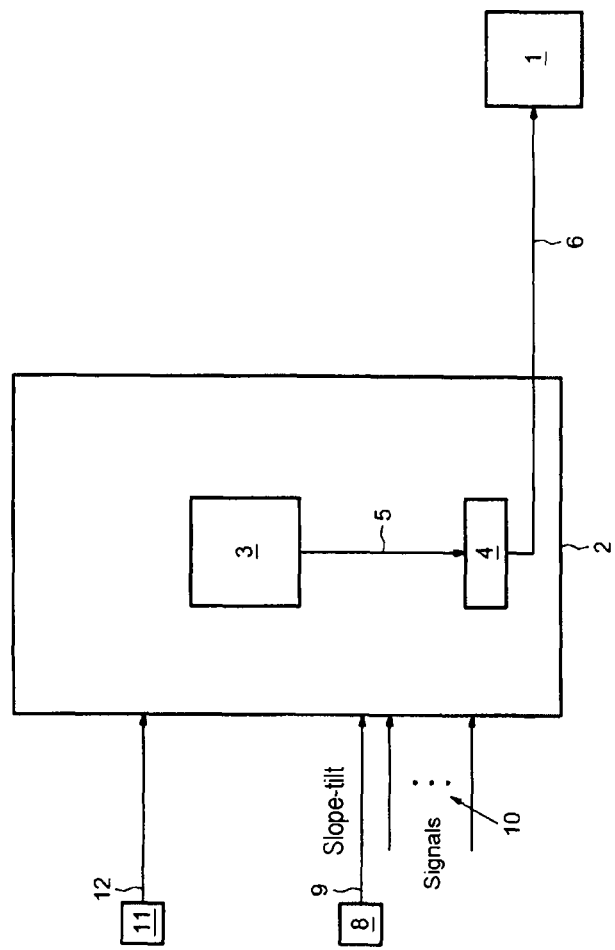

SYSTEM FOR CONTROLLING THE RELEASE OF AN AUTOMATIC PARKING BRAKE DEVICE ONBOARD AN AUTOMOBILE

BACKGROUND

The present invention relates to a system and a method for controlling the release of an automatic parking brake device, on board an automobile.

The French patent application no. 2 828 450 (RENAULT) discloses a system for controlling the release of an automatic parking brake device, on board an automobile, wherein, if conditions representative of a hill start or maneuver are met, a command to release the parking brake is emitted a plurality of times, to actuators of the brakes, necessitating a multiple emission of a parking brake release command.

The patent applications GB 2 376 990 and GB 2 342 967 relate to the generation of a parking brake release command respectively according to the position of the clutch pedal and according to the torque measured on the wheels. These documents also include the emission of a parking brake release command a plurality of times.

These systems are not suitable for operating with brake actuators that require the sending of a single brake release command, notably because a multiple sending of a release command can lead to an excessive gap between the piston of a brake and the brake disc, allowing the possibility for foreign bodies such as dust to infiltrate therein, potentially causing an accelerated degradation of the brake. Furthermore, in the subsequent clamping, the clamping time of a brake is increased, because it is first of all essential for the piston to come back into contact with the disc, hence problems of noise and slowness of clamping.

Furthermore, such systems for controlling the release of an automatic parking brake device do not allow the driver to release the parking brake device at will, for example to deliberately delay the automatic release in the event of a hill start or a hill maneuver.

BRIEF SUMMARY

According to one aspect of the invention, there is proposed a system for controlling the release of an automatic parking brake device, on board an automobile. The system comprises emission means for emitting a command to release the parking brake device several times, and interface means, positioned between said emission means and said parking brake device, to receive said emissions of the release command and transmit a command to release said parking brake device.

Thus, the emission means suitable for brake actuators that require a multiple emission of a release command can easily be adapted, at low cost, to brake actuators for which the multiple sending of a release command is pointless.

In one embodiment, said emission means are adapted to emit said release command a predetermined number of times. Two successive emissions are separated by a predetermined time interval.

In one embodiment, the system comprises manual control means which can be actuated by the driver, to command a release of the parking brake device. Said interface means are adapted to emit a command to release the parking brake device when:
  the parking brake device is clamped, and
  said manual control means are not actuated or are defective, and
  said emission means emit a command to release the parking brake device, without having emitted any command to release the parking brake device within a preceding delay that is substantially equal to said predetermined time interval.

Thus, an assisted release of the brakes is possible if the brakes are effectively clamped, if the driver does not express any demand through the manual control means or if the manual control means are defective, and if the assisted hill start or hill maneuver conditions are met.

When these conditions are not met, the release demand is not transmitted to the brake actuators, and if the emission means emit a command to deactivate the automatic parking brake device, the interface means command the deactivation of the assistance of the parking brake device.

In one embodiment, the system comprises manual control means, which can be actuated by the driver, to command a release of the parking brake device. Said interface means are adapted to emit a command to release the parking brake device when:
  the parking brake device is clamped or being clamped, and
  said manual control means are not actuated or are defective, and
  said emission means emit a command to release the parking brake device, without having emitted any command to release the parking brake device within a preceding delay that is substantially equal to said predetermined time interval.

It is thus possible to stop the clamping of the parking brake device and immediately perform a release if a hill start or maneuver demand is made.

In one embodiment, said interface means are adapted to deactivate the automatic parking brake device when said emission means emit a command to deactivate the automatic parking brake device.

According to another aspect of the invention, there is also proposed a method for controlling the release of an automatic parking brake device, on board an automobile, wherein a multiple emission of a command to release the parking brake device is modified to an emission of a command to release the parking brake device for brake actuators unsuited to said multiple emission of a release command.

BRIEF DESCRIPTION OF THE DRAWINGS

The invention will be better understood from studying the following detailed description of a few embodiments taken as non-limiting examples and illustrated by the appended drawing representing a system for controlling the release of an automatic parking brake device according to one aspect of the invention.

DETAILED DESCRIPTION

The FIGURE illustrates an exemplary system for controlling the release of an automatic parking brake device 1, on board an automobile, that makes it possible to assist the driver in a hill start or a hill maneuver. The parking brake device 1 is controlled according to different parameters by an electronic control unit 2.

The electronic control unit 2 is provided with an emission module 3 for emitting a command to release the parking brake device 1 several times. The electronic control unit 2 also comprises an interface module 4 positioned between the emission module 3 and the parking brake device 1. The interface module 4 receives successive emissions of a release command from the emission module 3 via a connection 5. For example, the successive emissions of the release command are spaced apart by a predetermined time interval. The interface module 4 transmits a release command to the parking brake device 1 via a connection 6. The interface module 4 transmits a release command to the parking brake device 1 for all the successive emissions of the release command from the emission module 3.

The automatic parking brake device 1 is, for example, controlled by the electronic control unit 2, so that, when the torque transmitted to the drive wheels of the vehicle compensates the effects induced by the slope, the emission module 3 of the electronic control unit 2 commands the release of the automatic parking brake device 1.

Also, the electronic control unit 2 receives information representative of the slope $\theta_{tilt}$ from a slope sensor 8, via a connection 9. The electronic control unit 2 also receives a plurality of other signals 10 supplied by various sensors or estimators on board the vehicle. These signals are representative of the value of various operating parameters of the vehicle, for example the position of the clutch pedal, the position of the accelerator pedal, the longitudinal speed of the vehicle, or the engine rotation speed.

The system further comprises a manual control module 11 linked to the electronic control unit 2 by a connection 12, and which can be actuated by the driver, to command a clamping or a release of the parking brake device 1. The manual control module 11 can, for example, comprise a push button, a tactile element or any other element that can be actuated manually by the driver.

In order to explain various embodiments of the interface module 4, the following parameters are defined:

EPB_status represents the status of the parking brake device 1,

EPB_switch represents the status of the manual control module 11 that can be actuated by the driver, TOA_demand represents the action of the emission module 3, and TOA_demand_ev represents the action of the interface module 4.

The predetermined values of these various parameters are defined as follows:

$$EPB\_status = \begin{cases} 0: & \text{brakes clamped} \\ 1: & \text{brakes released} \\ 2: & \text{clamping} \\ 3: & \text{releasing} \\ 4: & \text{actuator defective} \end{cases}$$

$$EPB\_switch = \begin{cases} 0: & \text{neutral, no demand from the driver} \\ 1: & \text{release of the brakes demanded by the driver} \\ 2: & \text{clamping of the brakes demanded by the driver} \\ 3: & \text{manual control module defective} \end{cases}$$

$$TOA\_demand = \begin{cases} 0: & \text{no release demand following a hill start or maneuver assistance strategy} \\ 1: & \text{mulitiple release demands following for example, a hill start or maneuver assistance strategy} \\ 2: & \text{hill start or maneuver assistance strategy deactivated} \end{cases}$$

$$TOA\_demand\_ev = \begin{cases} 0: & \text{no release demand following a hill start or maneuver assistance strategy} \\ 1: & \text{release demand following a hill start or maneuver assistance strategy} \\ 2: & \text{hill start or meneuver assistance strategy deactivated} \end{cases}$$

By using k to denote an index whose incrementation by one unit represents the elapsing of a predetermined time interval separating two successive emissions of a release command by the emission module 3, it is possible to illustrate the operation of the interface module 4 by:

$$TOA\_demand\_ev(k) = \begin{cases} 1 & \text{if } (EPB\_status = 0) \text{ and} \\ & ((EPB\_switch = 0) \text{ or} \\ & (EPB\_switch = 3)) \text{ and} \\ & (TOA\_demand(k) = 1) \text{ and} \\ & (TOA\_demand(k-1) = 0) \\ 2 & \text{if } TOA\_demand(k) = 2 \\ 0 & \text{otherwise} \end{cases}$$

Thus, the interface module 4 gives priority to the demands made deliberately by the driver via the manual control module 11. A release demand is sent to the parking brake device 1 only when the brakes are actually clamped, which avoids trying to release brakes that are already released or that are already being released.

It is also possible, in a simple and robust manner, to intentionally delay a release command generated by an automatic parking brake device for assistance in a hill start or maneuver. It is possible to perform an assisted hill start or maneuver even in the event of failure or defective operation of the manual control module 11, thus avoiding an immobilization of the vehicle.

As a variant, it is possible to illustrate another embodiment of the interface module 4 by:

$$TOA\_demand\_ev(k) = \begin{cases} 1 & \text{if } ((EPB\_status = 0) \text{ or} \\ & (EPB\_status = 2)) \text{ and} \\ & ((EPB\_switch = 0) \text{ or} \\ & (EPB\_switch = 3)) \text{ and} \\ & (TOA\_demand(k) = 1) \text{ and} \\ & (TOA\_demand(k-1) = 0) \\ 2 & \text{if } TOA\_demand(k) = 2 \\ 0 & \text{otherwise} \end{cases}$$

Compared to the previous embodiment, this embodiment offers the benefit of stopping a clamping of the brakes that is in progress and of immediately performing a release of the brakes when an assisted hill start or assisted hill maneuver demand is generated.

As a variant, the interface module 4 can take account of additional parameters such as the opening of a door, the presence of a driver, or the fastening of a seat belt, so as to further increase the safety of the occupants of the vehicle.

The invention makes it possible, at low cost, to adapt a system for controlling the release of an automatic parking brake device equipped with an emission module emitting a release command several times to a parking brake device not designed to operate with a release command duplicated several times.

The invention claimed is:

1. A system for controlling the release of an automatic parking brake device from a brake disc, on board an automobile, comprising:
   emission means for emitting a command to release the parking brake device several times in response to a torque transmitted to drive wheels of the automobile overcoming a downhill force from a slope on which the automobile is positioned,
   interface means, positioned between said emission means and said parking brake device, to receive said emissions of the release command from the emission means to prevent the emissions of the release command emitted by the emission means from reaching the parking brake device and, after receiving the release command from the emission means several times, to transmit a single command to release said parking brake device only when a set of conditions is met, and
   the parking brake device being configured to release from the brake disc upon receipt of the command from the interface means,
   wherein the emissions of the release command by the emission means, if received by the parking brake device, would each cause the parking brake device to release from the brake disc.

2. The system as claimed in claim 1, wherein said emission means are adapted to emit said release command a predetermined number of times, two successive emissions being separated by a predetermined time interval.

3. The system as claimed in claim 2, comprising manual control means, which can be actuated by the driver, to command a release of the parking brake device, wherein said interface means are adapted to emit a command to release the parking brake device when:
   the parking brake device is clamped or the parking beak device is being clamped, and
   said manual control means are not actuated or are defective, and
   said emission means emit the command to release the parking brake device multiple times, without having emitted any command to release the parking brake device within a preceding delay that is substantially equal to said predetermined time interval.

4. The system as claimed in claim 3, wherein said interface means are adapted to deactivate an automatic release of the parking brake device when said emission means emit a command to deactivate the automatic release of the parking brake device.

5. A method for controlling the release of an automatic parking brake device from a brake disc, on board an automobile, comprising:
   emitting, via an emission module, a command to release the parking brake device several times in response to a torque transmitted to drive wheels of the automobile overcoming a downhill force from a slope on which the automobile is positioned;
   receiving, via an interface module, the command from the emission module to release the parking brake device to prevent the emissions of the release command emitted by the emission module from reaching the parking brake device;
   after receiving the release command from the emission module several times, emitting, via the interface module, a single command to release the parking brake device only when a set of conditions is met; and
   releasing the parking brake device only upon receipt of the command from the interface module.

6. A system for controlling the release of an automatic parking brake device from a brake disc, on board an automobile, comprising:
   an emission module configured to emit a command to release the parking brake device several times in response to a torque transmitted to drive wheels of the automobile overcoming a downhill force from a slope on which the automobile is positioned,
   an interface module, positioned between said emission module and said parking brake device, to receive the release command from the emission module to prevent the emissions of the release command emitted by the emission module from reaching the parking brake device and, after receiving the release command from the emission means several times, to transmit a single command to release said parking brake device only when a set of conditions is met, and
   the parking brake device being configured to release from the brake disc upon receipt of the command from the interface module,
   wherein the emissions of the release command by the emission means, if received by the parking brake device, would each cause the parking brake device to release from the brake disc.

7. The system as claimed in claim 6, wherein said emission module is adapted to emit said release command a predetermined number of times, two successive emissions being separated by a predetermined time interval.

8. The system as claimed in claim 7, further comprising a manual control module configured to be actuated by the driver to command a release of the parking brake device,
   wherein said interface module is adapted to emit a command to release the parking brake device when:
   the parking brake device is clamped, and
   said manual control module is not actuated or are defective, and
   said emission module emits the command to release the parking brake device multiple times, without having emitted any command to release the parking brake device within a preceding delay that is substantially equal to said predetermined time interval.

9. The system as claimed in claim 7, further comprising a manual control module configured to be actuated by the driver to command a release of the parking brake device,
   wherein said interface module is adapted to emit a command to release the parking brake device when:
   the parking brake device is clamped or being clamped, and
   said manual control module is not actuated or are defective, and
   said emission module emits the command to release the parking brake device multiple times, without having emitted any command to release the parking brake device within a preceding delay that is substantially equal to said predetermined time interval.

10. The system as claimed in claim 8, wherein said interface module is adapted to deactivate an automatic release of the parking brake device when said emission module emits the command to deactivate the automatic release of the parking brake device.

* * * * *